US011062355B2

(12) United States Patent
Ganesh et al.

(10) Patent No.: US 11,062,355 B2
(45) Date of Patent: Jul. 13, 2021

(54) MITIGATION OF PERISHABLE PRODUCT WASTE THROUGH PROMOTION RECOMMENDATION

(71) Applicant: INTERNATIONAL BUSINESS MACHINES CORPORATION, Armonk, NY (US)

(72) Inventors: Bharath Ganesh, Bangalore (IN); Gerin Jacob, Bangalore (IN); Dhandapani Shanmugam, Bangalore (IN); Tuhin Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 15/817,385

(22) Filed: Nov. 20, 2017

(65) Prior Publication Data

US 2019/0156369 A1 May 23, 2019

(51) Int. Cl.
*G06Q 30/00* (2012.01)
*G06Q 30/02* (2012.01)

(52) U.S. Cl.
CPC ..... *G06Q 30/0264* (2013.01); *G06Q 30/0252* (2013.01); *G06Q 30/0254* (2013.01); *G06Q 30/0255* (2013.01); *G06Q 30/0259* (2013.01)

(58) Field of Classification Search
CPC .... G06Q 30/02; G06Q 30/021; G06Q 30/022; G06Q 30/023; G06Q 30/024; G06Q 30/025; G06Q 30/026; G06Q 30/027
See application file for complete search history.

(56) References Cited

U.S. PATENT DOCUMENTS

| | | | |
|---|---|---|---|
| 7,912,748 B1 | 3/2011 | Rosenberg et al. | |
| 8,639,558 B2 | 1/2014 | Desai et al. | |
| 10,009,667 B2 | 6/2018 | Taylor | |
| 10,740,814 B2 | 8/2020 | Gandhi et al. | |
| 2008/0255941 A1* | 10/2008 | Otto | G06Q 10/087 |
| | | | 705/14.24 |
| 2015/0006292 A1 | 1/2015 | Li et al. | |
| 2015/0161629 A1 | 6/2015 | Verma | |
| 2016/0155144 A1* | 6/2016 | Daly | G06Q 30/0246 |
| | | | 705/14.45 |
| 2016/0300285 A1* | 10/2016 | Gandhi | G06K 19/0723 |
| 2017/0109776 A1 | 4/2017 | Marshak | |
| 2017/0353827 A1* | 12/2017 | D'Alberto | H04W 4/029 |

* cited by examiner

*Primary Examiner* — Alvin L Brown
(74) *Attorney, Agent, or Firm* — L. Jeffrey Kelly (57) ABSTRACT

Embodiments of the present invention disclose a method, computer program product, and system for generating a schedule for promotions using promotional windows. A set of product data associated with a plurality of products is received. Promotion data is received, and a plurality of intensity scores are calculated for the associated promotional data. A set of target product data associated with a target product is determined. A set of target promotional attributes is determined and a plurality of promotion windows are generated for display. A confidence value is determined for each generated promotion window of the plurality of promotion windows. An order list is generated for display. In response to receiving a second set of promotion data, the determined confidence value is modified for each generated promotion window of the plurality of promotion windows.

20 Claims, 4 Drawing Sheets

MITIGATION OF PERISHABLE PRODUCT WASTE THROUGH PROMOTION RECOMMENDATION

BACKGROUND

The present invention relates generally to the field of computer data modeling, and more particularly to model generation of the effects of external events on consumer-packaged goods.

Perishable items are often put on clearance sale when it nears expiry date in order to clear inventory, maximize profits, or minimize loss of product. Typically, products are discarded if not sold by the expiration date. Promotions, such as putting items on "sale" or "clearance," are used to avoid having to discard the expired items. It may be advantageous to determine an optimal promotion time frame or window to maximize profits and minimize waste.

SUMMARY

Embodiments of the present invention disclose a method, computer program product, and system for generating a schedule for promotions using promotional windows. A set of product data associated with a plurality of products is received. Promotion data is received, wherein the received promotional data includes a set of promotional attributes associated with at least one product of the plurality of products. A plurality of intensity scores are calculated for the associated promotional data based on a likelihood of occurrence value associated with each promotional attribute of the set of promotional attributes associated with at least one product of the plurality of products. In response to receiving a query for a promotion window for a target product, a set of target product data associated with a target product is determined. A set of target promotional attributes is determined based on the determined target product data and the calculated plurality of intensity scores, wherein the attributes include at least a promotion duration, a delivery channel, and an expected inventory holding period. A plurality of promotion windows are generated for display, associated with the target product, based on the generated target promotional attributes, wherein the promotion window includes at least a start date and an end date. A confidence value is determined for each generated promotion window of the plurality of promotion windows. An order list is generated for display, wherein the ordered list comprises the generated plurality of promotion windows and the order is based on the determined confidence value. In response to receiving a second set of promotion data, the determined confidence value is modified for each generated promotion window of the plurality of promotion windows.

DETAILED DESCRIPTION

Embodiments of the present invention relate to the field of computing, and more particularly to model generation of the effects of external events on consumer-packaged goods. The following described exemplary embodiments provide a system, method, and program product to, among other things, model the effects of external events such as weather, local events and other incidents to predict the optimal promotion window for retail consumer packaged goods, such as, for example, perishable consumer goods. Therefore, the present embodiment has the capacity to improve the technical field of model generation by increasing the efficiency of generating promotion window schedules and increasing the effectiveness of multiple promotion window suggestions for specific products or stock keeping units.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described in connection with an embodiment, it is submitted that it is within the knowledge of one skilled in the art to affect such feature, structure, or characteristic in connection with other embodiments whether or not explicitly described.

In various existing solutions, the focus on defining promotion windows may be based on general optimization algorithms, genetic algorithms, or an exhaustive manual search of historical sales. A promotion window may include a sequence of price cuts from regular price, where the price cuts may increase or decrease over time. Overall, manually curated individual promotion windows remain static and are often decided based on the history of similar promotional activities; however, multiple promotional windows may occur consecutively.

External factors such as weather, local events or other incidents often cause a positive or a negative impact on the demand of a product or stock keeping unit. These aspects may not be reflected in the historical sales of a stock keeping unit nor reflected in past static promotional activities. It may be advantageous to consider external factors such as weather or events in order to modify the promotion window such that a low or no sale product during the originally promotion window may be avoid through the generation of dynamic promotion windows. Generating a dynamic promotion window will increase the effectiveness of targeted sales and promotions. It may also be advantageous to dynamically adjust, in real-time, various aspects of the promotion window, together or individually, for example, the duration of promotional windows, or discount rate.

Figure 1:
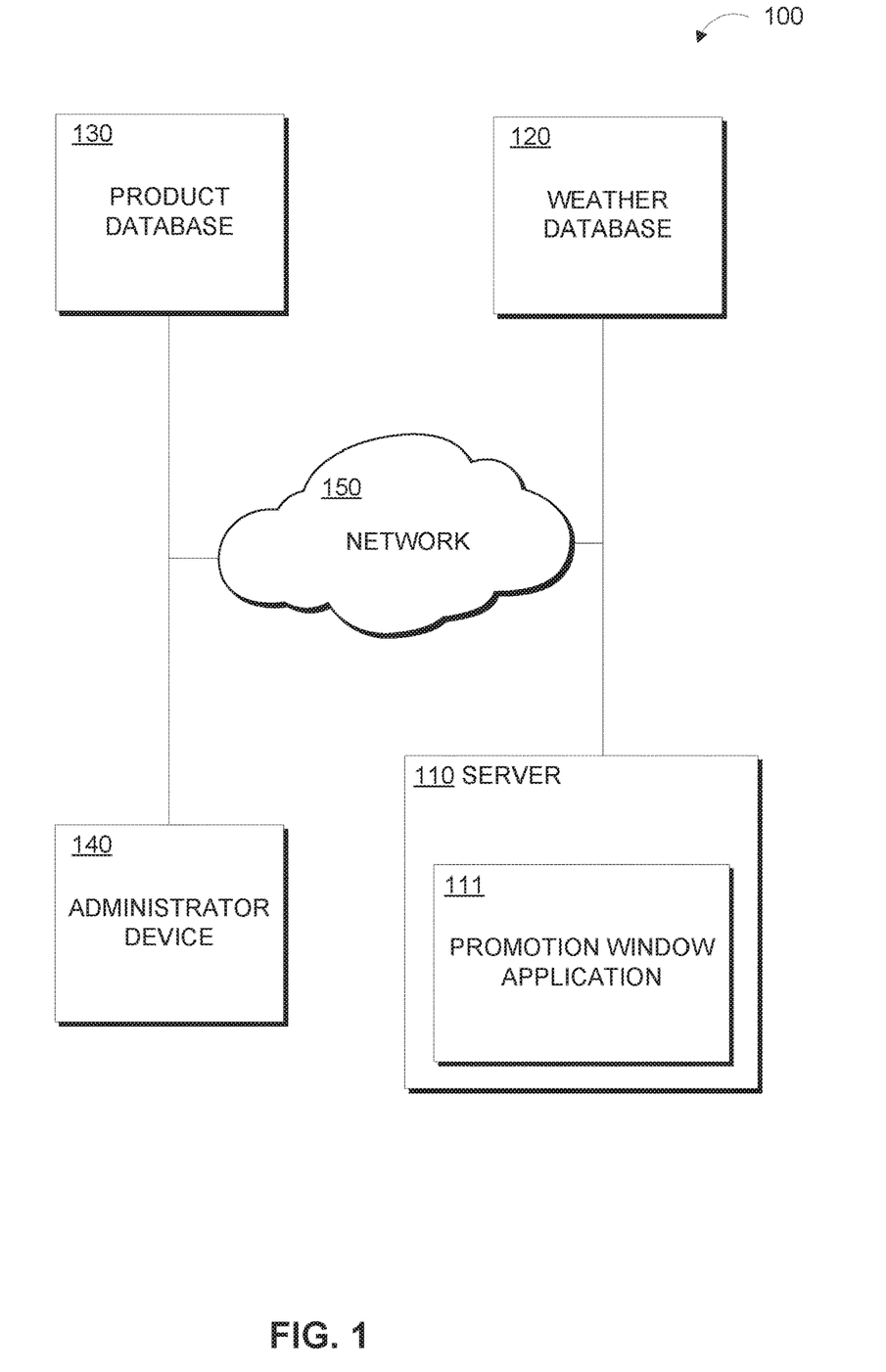
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data processing environment 100 includes server 110, weather database 120, product database 130, and administrator device 140, all interconnected over network 150.

In various embodiments, network 150 can be, for example, a local area network (LAN), a wide area network (WAN) such as the Internet, or a combination of the two, and can include wired, wireless, or fiber optic connections. In general, network 150 can be any combination of connections and protocols that will support communications between server 110, weather database 120, product database 130, and administrator device 140.

Server 110, weather database 120, product database 130, and administrator device 140 may be a laptop computer, tablet computer, netbook computer, personal computer (PC), a desktop computer, a smart phone, or any programmable electronic device capable of communicating via network 150 with various components and devices distributed data processing environment 100. In various embodiments, server 110 may be a separate server or series of servers, a database, or other data storage, internal or external to weather database 120, product database 130, and administrator device 140.

In various embodiments, weather database 120 may be any computer readable storage media accessible via network 150. Weather database 120 may receive weather data associated with various geographical locations based on geographical data, for example, via a global positioning system. Weather database 120 may index the weather data and geographic data and communicate weather data and geographic data to server 110 based on a query associated with a geographical location.

In various embodiments, product database 130 may be any computer readable storage media accessible via network 150. Product database 130 may store an index of various products or stock keeping units and promotional attributes associated with each product. Promotional attributes may include a purchase date, a storage start date, an expiration data, and historical sales data. Historical sales data may include past promotions associated with the product, discount rates historically associated with the product, the number of units sold during various time periods, the distribution channel, payment methods associated with the product, and the like.

In various embodiments, administrator device 140 may act generally to host an application capable of display, in a graphical user interface, or communicate over a network, for example network 150, via a web browser. In various embodiments of the invention, administrator device 140 may communicate with other computing devices within distributed data processing environment 100. Administrator device 140 may communicate the target product(s) to be put in a promotion schedule, or a promotion window query and its associated product, the desired promotion window length, and/or data on any upcoming events that. In various embodiments, upcoming events may be determined based on historical data on previous product sales, for example, historical data indicating an increase in sales of frozen burgers in the first week July may generate upcoming events data even without user input of an event on July $4^{th}$. In various embodiments, administration device 140 may include a global positioning system and may periodically query weather database 120 and communicate the geographical location of administrator device 140 and receive weather data from weather database 120, corresponding to the geographical location of administrator device 140.

In various embodiments, server 110 includes promotion window application 111, as described in more detail below in reference to FIG. 2. Promotion window application 111 acts generally to receive weather data, geographical data, product data, various event data, a query for a promotion window, and a target product associated with the promotion window query. Promotion window application 111 may analyze the received data and calculate a score for the received weather data and event data, or intensity score, representing how much the weather or event may affect the promotion window for the target product. In various embodiments, machine learning techniques may be used to calculate an intensity score, where the received data is used as training data to generate an intensity score. Based on the analyzed data and calculated intensity scores, promotion window application 111 may generate a plurality of promotion windows and calculate a confidence value for each generated promotion window representing the confidence that an associated promotion window will yield the highest sales and least waste of the target product. In various embodiments, machine learning techniques may be used to generate a plurality of promotion windows and associated confidence values, where the received data is used as training data to generate promotion windows.

Figure 4:
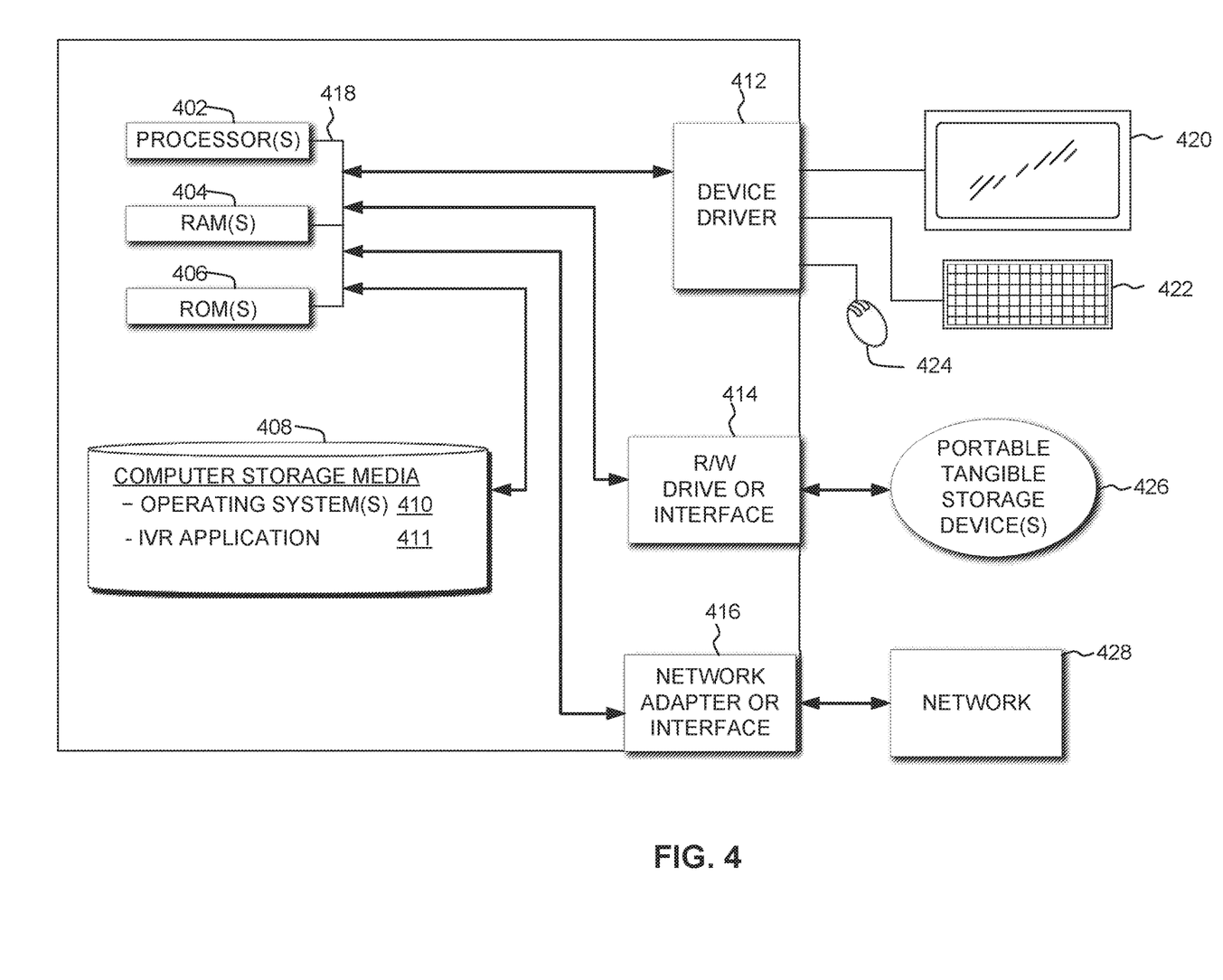
FIG. 4 depicts a block diagram of components of the server computer executing the ingestion application, in accordance with an embodiment of the present invention.

Server 110 may include internal and external hardware components, as depicted and described in further detail with respect to FIG. 4. In various embodiments, administrator device 140 may include promotion window application 111, in order to perform the functions of server 110 described herein.

Figure 2:
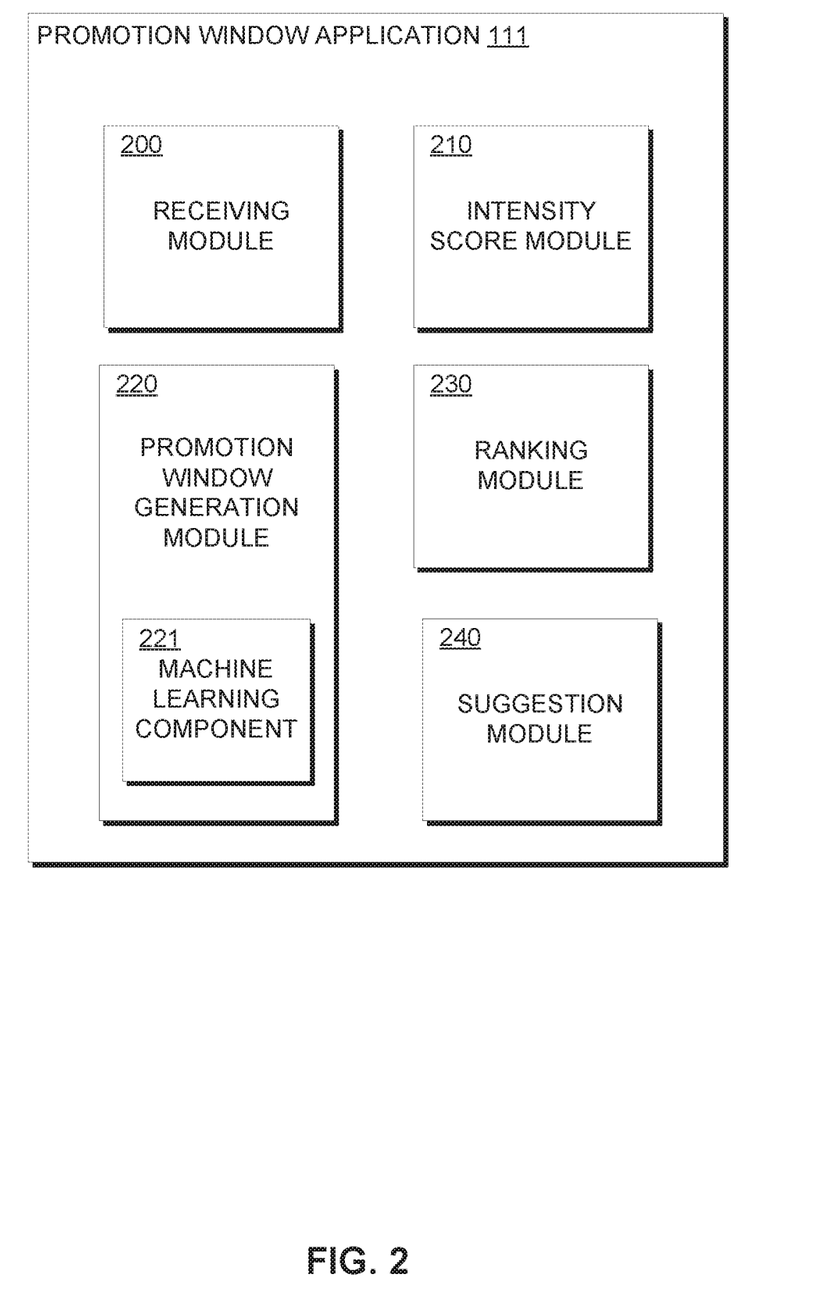
FIG. 2 is a functional block diagram illustrating the components of an application within the distributed data processing environment, in accordance with an embodiment of the present invention.

FIG. 2 is a functional block diagram illustrating the components of promotion window application 111 within the distributed data processing environment, in accordance with an embodiment of the present invention. Promotion window application 111 includes receiving module 200, intensity score module 210, promotion window generation module 220, ranking module 230, and suggestion module 240.

In reference to FIGS. 1 and 2, receiving module 200 may receive a query for a promotion window for a particular product, or target product, for example, from administrator device 140. Receiving module 200 may query a database or series or databases for data associated with the target product. For example, receiving module 200 may query product database 130 for product attributes associated with the target product and query weather database 120 for weather data associated with the geographical location associated with the target product.

In various embodiments, receiving module 200 may receive a set of product data associated with a plurality of products, including promotion attributes associated with each product of the plurality of products, for example, a purchase date, a storage start date, an expiration data, historical sales data for each product, delivery chain data, and/or current product location. Receiving module 200 may receive a set of weather data associated with a determined product location, a predetermined store location and/or surrounding geographical location. The product and weather data may be correlated historically and stored for later analysis, for example, in response to a query for a target product promotion window, the target product being a specific product of the plurality of products. Receiving module 200 may communicate the weather data to intensity score module 210 and the product data and the associated target product promotion window query to promotion window generation module 220.

Intensity score module 210 may receive weather data from receiving module 200. Intensity score module 210 may analyze the received weather data and the historical sales data in order to calculate an intensity score associated with the weather data. In various embodiments, machine learning or other algorithm may analyze historical data to calculate an intensity score. In various embodiments, intensity score module 210 may calculate intensity scores for various time periods, for example, daily, weekly, or monthly. Intensity score module 210 may communicate the intensity score to promotion window generation module 220.

Promotion window generation module 220 may receive product data associated with a target product and a target product promotion window query from receiving module 200. Promotion window generation module 220 may also receive weather data with a corresponding intensity score from intensity score module 210. Promotion window generation module 220 may analyze the received data and generate a set of promotion windows associated with the target product of the target product promotion window query. The promotion windows generated by promotion window generation module 220 may include various promotion features, for example, promotion window duration or promotion length, product discount rate, payment method or payment mode, expected number of items to be sold, and the like. The promotion windows generated by promotion window generation module 220 may vary in one or all of the promotion features, for example, length, for example, one day sale or one two-week sale, or discount rate, for example, 5% discount rate or 10% discount rate. Promotion window generation module 220 may communicate the generated promotion windows to ranking module 230.

In various embodiments, promotion window generation module 220 may generate promotion windows using machine learning. Promotion window generation module 220 may include machine learning component 221. In various embodiments, machine learning component 221 may be internal or external to any device within distributed data processing environment 100 of FIG. 1. Machine learning component 221 may receive training data from various devices within distributed data processing environment 100 of FIG. 1 via promotion window generation module 220. For example, machine learning component 221 may receive product data, including promotional attributes, from product database 130, weather data, including geographical data using a global positioning system, from weather database 120, a target product promotion window query from administrator device 140, and intensity scores from intensity score module 210. Machine learning component 221 may analyze the received data and extract the features, features being individual measurable property or characteristic of a product. Machine learning component 221 may generate n-dimensional vectors based on the extracted numerical features, or feature vectors. Machine learning component 221 may generate a promotion window model based on the generated feature vectors and generate a set of unordered promotion windows for the target product based on that promotion window model and data related associated with the target product. Machine learning component 221 may communicate the set of target promotion windows to ranking module 230.

Ranking module 230 may receive generated target promotion windows from promotion window generation module 220. In various embodiments, ranking module 230 received target promotion windows from machine learning component 221, as described above. Ranking module 230 may generate confidence values associated with each generated promotion window of the set of promotion windows, based on business metrics. Business metrics may be, for example, projected profit margin or projected quantity of items sold within a promotion window duration. In various embodiments, the business metrics may be predetermined, for example, by user input selections received via administrator device 140. In various embodiments, ranking module 230 may use various ranking methods and optimization algorithms found in the art. Ranking module 230 may communicate the generated target promotion windows and the associated confidence values to suggestion module 240.

Suggestion module 240 may receive generated target promotion windows and associated confidence scores. Suggestion module 240 communicates promotion windows with an associated confidence score above a threshold to a display, for example, a GUI or display application on administrator device 140. Suggestion module 240 may receive user input, for example, selection input via administrator device 140, and modify the confidence scores of the received generated promotion windows, based on the user input. In various embodiments, the promotion window with the highest associated confidence score is communicated to administrator device 140 or automatically implemented for the target product. For example, automatic discount rate applied to the target product via a point of sale system for the promotion window duration.

In various embodiments, receiving module 200 may receive social media metadata and associated geographic data associated with customers from administrator device 140 via server 110. Intensity score module 210 may calculate an intensity score as described above and modify the intensity score based on the received social media metadata and geographic data. Social media metadata may also be used to track individuals during a known event occurring within a geographical radius of a store. Intensity score module 210 may modify the calculated intensity score based on the geographical location of individuals at a known event or a proximity distance to a store location. Analyzed social media metadata may be used to modify promotion windows generated based on the modified calculated intensity scores. In various embodiments, various tags, posts, or mentions of a product on social media may be used to modify the promotion window as an increase in social media activity associated with a product may indicate increased interest in that product or related product. For example, in response to a unique ice cream flavor begins trending on social media, promotion window generation module 220 may initiate a new promotion window to modify the start time and/or end time of generated promotion windows.

In various embodiments traffic tracking data may be received in conjunction with weather data, social media metadata, or geographical data to modify intensity scores or confidence values. For example, a traffic jam north of a store location may cause north bound cars to be backed up. Some vehicle operators may choose alternate routes closer to a store location or stop off at a store location for products, for example snacks or small board games. Traffic data may be user to initiate new promotion windows or modify existing promotion windows based on the modified calculated intensity scores.

It should be apricated that, in various embodiments, promotion window application 111 continuously queries data sources for updates on predicted or predetermined external factors, and their associated data, in order continuously revise the generated promotion windows, associated confidence value, and rank within the generated ordered list.

Figure 3:
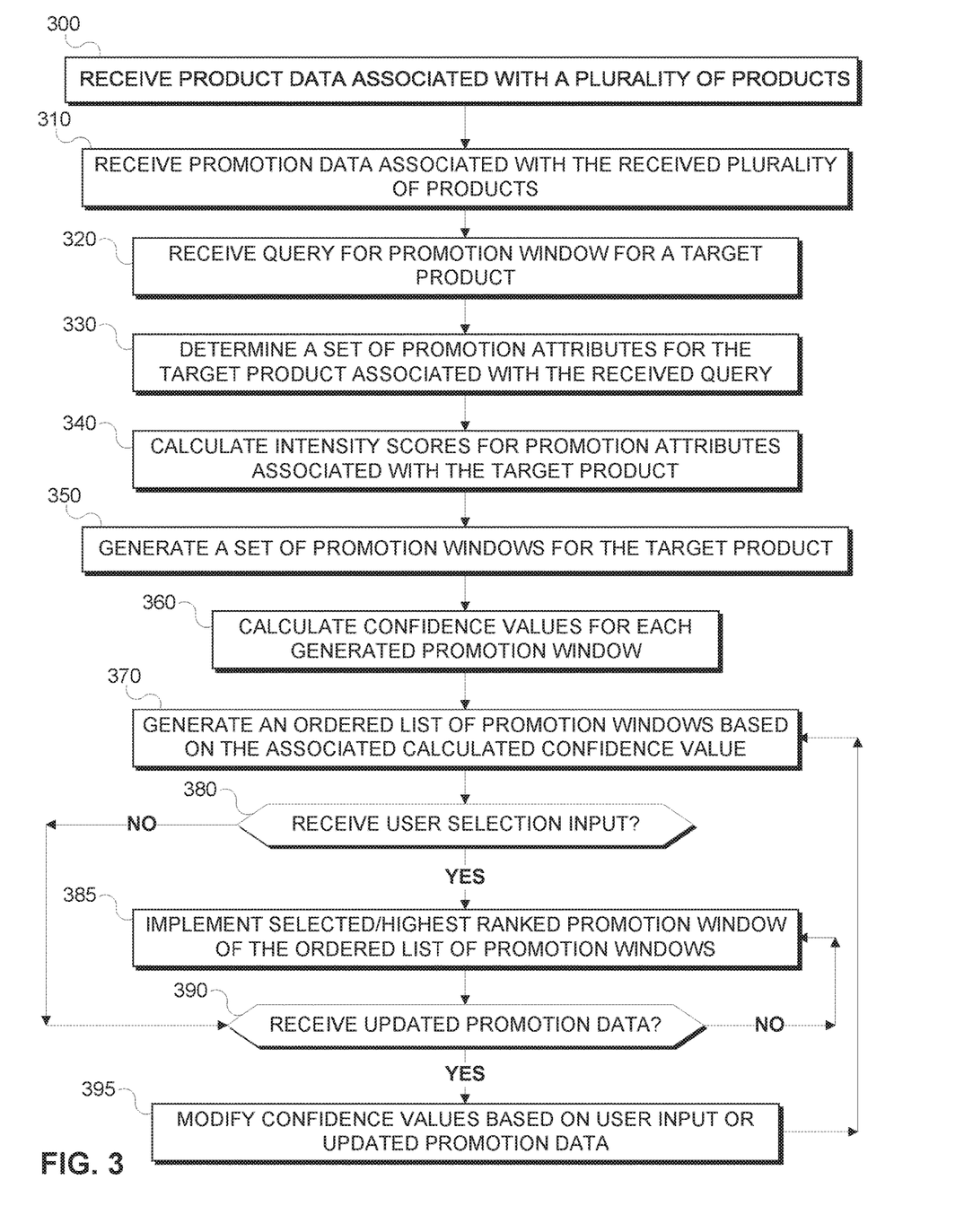
FIG. 3 is a flowchart depicting the operational steps of an application, on a server computer within the distributed data processing environment of FIG. 1, in accordance with an embodiment of the present invention.

FIG. 3 is a flowchart depicting the operational steps of promotion window application 111, on server 110 within distributed data processing environment 100 of FIG. 1, in accordance with an embodiment of the present invention. Receiving module 200 receives a set of product data associated with a plurality of products (block 300), the received set of product data includes at least a product location, based on, for example, delivery chain location data or global positioning system data, and a product expiration date.

Receiving module 200 receives promotion data associated with the received plurality of products (block 310). The promotion data including a set of promotional attributes associated with at least one product of the plurality of products. Receiving module 200 receives various promotional attributes associated with at least one of the products of the plurality of products that may include: a sales history, a desired promotion start data, a product discount rate that may be predetermined or calculated based on the sales history, current and historical weather data associated with the location of the products, and local event data that may influence the promotion window or calculated discount.

Receiving module 200 receives a query for a target product promotion window for an associated target product (block 320). Receiving module 200 determines a product of the plurality of products associated with the received query matches the target product, for example matching the target product associated with the received query to a product in a store inventory. Receiving module 200 determines the product attributes associated with the target product (block 330) based on the promotion attributes associated with the matched product of the plurality of products. Receiving module 200 communicates the target product and determined associated promotion attributes to intensity score module 210.

Intensity score module 210 calculates a plurality of intensity scores for the associated promotional data (block 340). The calculation is based on a likelihood of occurrence of each promotional attribute of the set of promotional attributes associated with the products of the plurality of products. In various embodiments, intensity score module 210 calculated the intensity scores for the associated promotional data dynamically. For example, intensity score module 210 may receive weather data. Periodically, intensity score module 210 may query for updates in the weather data. Based on the received weather data, intensity score module 210 may calculate a likelihood of occurrence for rain. For a target product related to rain gear the intensity score may be higher than a target product related to outdoor grilling. Intensity score module 210 communicates calculated intensity scores and associated promotional attributes to promotion window generation module 220.

Promotion window generation module 220 generates a set of promotion windows (block 350) based on the received target product, associated promotion attributes, and calculated intensity scores. Each promotion window in the generated set of promotion windows may include a start date, and end date, and a discount rate. In various embodiments, the discount rate may be a set value, a linearly increasing or decreasing value over time, or an exponentially increasing or decreasing value over time, based on the promotional attributes of the target product. For example, if sales of a target product are decreasing the discount rate may exponentially increase over the term of the promotion window or if sales continue to decrease.

The set of promotion windows may have various start dates, end dates, and discount rates as variations or uncertainty in the promotion attributes, for example weather data or event data, may yield varied optimal promotion windows. Promotion window generation module 220 calculates a confidence value for each generated promotion window of the plurality of promotion windows (block 360). The calculated confidence value may be based on analyzing the promotional attributes associated with the target product and determine the probability that each promotion window of the set of promotion windows will satisfy one or more business metrics. For example, one or more business metrics may include, profit margins or number of units sold. Promotion window generation module 220 communicates the promotion windows and associated confidence scores to ranking module 230.

Ranking module 230 generates an ordered list of promotion windows for display to a user (block 370). The ordered list comprises the plurality of promotion windows generated by promotion window generation module 220 and the order, for example, ascending or descending, is based on the associated confidence value. Ranking module 230 communicates the ordered list of promotion windows to suggestion module 240. Suggestion module 240 communicates the ordered list of promotion windows for display to a user on a user device, for example, administrator device 140. In response to receiving a user input selection of a promotion window of the displayed promotion windows (block 380 "YES" branch), suggestion module 240 implements the selected promotion window for the associated target product (block 385). In various embodiments, suggestion module 240 may implement the highest ranked promotion window of the ordered list of promotion windows automatically.

In response to receiving a second set, or updated set, of promotion data (block 390 "YES" branch) suggestion module 240 modifies the determined confidence value for each generated promotion window of the plurality of promotion windows based on the updated promotion data (block 395). Suggestion module 240 communicates the modified confidence values to ranking module 230 in order to generate a modified ordered list based on the modified confidence values. In response to not receiving user input selection data and not receiving updated promotion data, suggestion module 240 implements the highest ranked promotion window in the set of ordered promotion windows.

FIG. 4 depicts a block diagram of components of server 110, weather database 120, product database 130, and administrator device 140 of distributed data processing environment 100 of FIG. 1, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Server 110, weather database 120, product database 130, and administrator device 140 may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411, for example, promotion window application 111, are stored on one or more of the computer readable storage media 408 for execution by one or more of the processors 402 via one or more of the respective RAMs 404 (which typically include cache memory). In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110, weather database 120, product database 130, and administrator device 140 may also include a R/W drive or interface 414 to read from and write to one or more portable computer readable storage media 426. Application programs 411 on server 110, weather database 120, product database 130, and administrator device 140 may be stored on one or more of the portable computer readable storage media 426, read via the respective R/W drive or interface 414 and loaded into the respective computer readable storage media 408.

Server 110, weather database 120, product database 130, and administrator device 140 may also include a network adapter or interface 416, such as a TCP/IP adapter card or wireless communication adapter (such as a 4G wireless communication adapter using OFDMA technology) for connection to a network 428. Application programs 411 on server 110, weather database 120, product database 130, and administrator device 140 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

Server 110, weather database 120, product database 130, and administrator device 140 may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Proposed is a system and method that models the effects of external events such as weather, local events and other incidents to predict the optimal promotion window for perishable retail CPG items. The system recommends the most optimal markdown/clearance promotion window amongst a set of possible windows for a specific product or stock keeping unit to mitigate the influence of external factors including weather and other incidents.

The system can suggest the most effective promotion window for each product or stock keeping unit. Existing systems can use this adjusted promotion window to come up with a markdown schedule that will be more effective in achieving the sales/clearance targets. Store managers can compare the effectiveness of multiple promotion windows suggested for a specific product or stock keeping unit.

Our invention builds a set of possible promotion windows, ranks them in the order of effectiveness considering the external influences (and quantifies the effects) thereby being able to recommend the most optimal promotion window. Hence this is completely different from the closest hit.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for generating a schedule for promotions using promotional windows, the method comprising:
   receiving product data for a plurality of products, wherein the received product data comprises a product location for each of the plurality of products based on a set of global positioning system data, and a product expiration date for each plurality of products, wherein the product expiration date is a date a product is discarded if not sold;
   receiving promotional attributes associated with the plurality of products;
   calculating an intensity score for each of the received promotional attributes based on how the promotional attribute will affect sales of the target product, wherein a first promotional attribute having a lower intensity score relative to an intensity score of a second promotional attribute indicates the first promotional attribute will have less of an affect on sales of the target product than the second promotional attribute;
   in response to receiving a query for a promotion window for a target product of the plurality of products, determining a set of promotional window attributes based on the determined product data of the target product and the calculated plurality of intensity scores of the promotional attributes associated with the target product, wherein the set of promotional window attributes include at least a promotion duration, a delivery channel, and an expected inventory holding period;
   generating, for display, a list of promotion windows associated with the target product based on the set of promotional window attributes, the expiration date of the target product, and an optimal promotional time frame to maximize profits and minimize waste of the target product for each of the promotion windows on the list, wherein each of the promotion windows on the list include a start date and an end date;
   assigning a score to each promotion window on the list based on anticipated sales and waste of the target product, wherein a first promotion window having a higher score relative to a score of a second promotion window indicates the first promotion window is anticipated to produce higher sales and less waste of the target product than the second promotion window; and
   ranking each of the promotion windows on the generated list of promotion windows in order based on the assigned scores.

2. The method of claim 1, wherein the promotional attributes associated with the plurality of products comprises:
   a sales history associated with the plurality of products;

a start date of a promotional window the plurality of products;

a predetermined discount associated with the promotional window for the product;

historical weather data associated with the product location of the plurality of products; and event data associated with events occurring within a predetermined proximity of the product location.

3. The method of claim 1,
further comprising:
modifying the assigned scored for each of the promotion windows on the generated list of promotion windows in response to receiving updated promotional attributes.

4. The method of claim 1, wherein generating the list of promotion windows is based on a user input selection of the list of promotion windows, wherein the list of promotion windows are displayed on a user device.

5. The method of claim 1, wherein the set of product data comprises:
a promotional window start date.

6. The method of claim 1, further comprising:
implementing a highest ranked promotion window of the list of promotion windows based on predetermined business metrics, wherein business metrics include at least one of: a profit margin value, and count of items sold value.

7. The method of claim 1, wherein determining a set of promotional window attributes comprises:
matching a target product associated with the query to a product of the plurality of products;
extracting product data associated with the matched product of the plurality of products; and
associating the extracted product data to the target product associated with the query.

8. A computer program product for generating a schedule for promotions using promotional windows, the computer program product comprising:
one or more computer-readable storage media and program instructions stored on the one or more computer-readable storage media, the program instructions executed by a processor to cause the process to perform a method comprising:
receiving product data for a plurality of products, wherein the received product data comprises a product location for each of the plurality of products based on a set of global positioning system data, and a product expiration date for each plurality of products, wherein the product expiration date is a date a product is discarded if not sold;
receiving promotional attributes associated with the plurality of products;
calculating an intensity score for each of the received promotional attributes based on how the promotional attribute will affect sales of the target product, wherein a first promotional attribute having a lower intensity score relative to an intensity score of a second promotional attribute indicates the first promotional attribute will have less of an affect on sales of the target product than the second promotional attribute;
in response to receiving a query for a promotion window for a target product of the plurality of products, determining a set of promotional window attributes based on the determined product data of the target product and the calculated plurality of intensity scores of the promotional attributes associated with the target product, wherein the set of promotional window attributes include at least a promotion duration, a delivery channel, and an expected inventory holding period;
generating, for display, a list of promotion windows associated with the target product based on the set of promotional window attributes, the expiration date of the target product, and an optimal promotional time frame to maximize profits and minimize waste of the target product for each of the promotion windows on the list, wherein each of the promotion windows on the list include a start date and an end date;
assigning a score to each promotion window on the list based on anticipated sales and waste of the target product, wherein a first promotion window having a higher score relative to a score of a second promotion window indicates the first promotion window is anticipated to produce higher sales and less waste of the target product than the second promotion window; and
ranking each of the promotion windows on the generated list of promotion windows in order based on the assigned scores.

9. The computer program product of claim 8, wherein the promotional attributes associated with the plurality of products comprises:
a sales history associated with the plurality of products;
a start date of a promotional window the plurality of products;
a predetermined discount associated with the promotional window for the products;
historical weather data associated with the product location of the plurality of products; and
event data associated with events occurring within a predetermined proximity of the product location.

10. The computer program product of claim 8,
further comprising:
modifying the assigned scored for each of the promotion windows on the generated list of promotion windows in response to receiving updated promotional attributes.

11. The computer program product of claim 8, generating the list of promotion windows is based on a user input selection of the list of promotion windows, wherein the list of promotion windows are displayed on a user device.

12. The computer program product of claim 8, wherein the set of product data comprises:
a promotional window start date.

13. The computer program product of claim 8, further comprising:
implementing a highest ranked promotion window of the list of promotion windows based on predetermined business metrics, wherein business metrics include at least one of: a profit margin value, and count of items sold value.

14. The computer program product of claim 8, wherein instructions to determine a set of promotional window attributes comprises:
instructions to match a target product associated with the query to a product of the plurality of products;
instructions to extract product data associated with the matched product of the plurality of products; and
instructions to associate the extracted product data to the target product associated with the query.

15. A computer system for generating a schedule for promotions using promotional windows, the computer system comprising:
one or more computer processors;
one or more computer-readable storage media;
program instructions stored on the computer-readable storage media for execution by at least one of the one or more processors, wherein the computer system is capable of executing the program instructions of a method comprising:

receiving product data for a plurality of products, wherein the received product data comprises a product location for each of the plurality of products based on a set of global positioning system data, and a product expiration date for each plurality of products, wherein the product expiration date is a date a product is discarded if not sold;

receiving promotional attributes associated with the plurality of products;

calculating an intensity score for each of the received promotional attributes based on how the promotional attribute will affect sales of the target product, wherein a first promotional attribute having a lower intensity score relative to an intensity score of a second promotional attribute indicates the first promotional attribute will have less of an affect on sales of the target product than the second promotional attribute;

in response to receiving a query for a promotion window for a target product of the plurality of products, determining a set of promotional window attributes based on the determined product data of the target product and the calculated plurality of intensity scores of the promotional attributes associated with the target product, wherein the set of promotional window attributes include at least a promotion duration, a delivery channel, and an expected inventory holding period;

generating, for display, a list of promotion windows associated with the target product based on the set of promotional window attributes, the expiration date of the target product, and an optimal promotional time frame to maximize profits and minimize waste of the target product for each of the promotion windows on the list, wherein each of the promotion windows on the list include a start date and an end date;

assigning a score to each promotion window on the list based on anticipated sales and waste of the target product, wherein a first promotion window having a higher score relative to a score of a second promotion window indicates the first promotion window is anticipated to produce higher sales and less waste of the target product than the second promotion window; and ranking each of the promotion windows on the generated list of promotion windows in order based on the assigned scores.

16. The computer system of claim 15, wherein the promotional attributes associated with the plurality of products comprises:
   a sales history associated with the plurality of products;
   a start date of a promotional window the plurality of products;
   a predetermined discount associated with the promotional window for the product;
   historical weather data associated with the product location of the plurality of products; and
   event data associated with events occurring within a predetermined proximity of the product location.

17. The computer system of claim 15,
further comprising:
   modifying the assigned scored for each of the promotion windows on the generated list of promotion windows in response to receiving updated promotional attributes.

18. The computer system of claim 15,
further comprising:
   modifying the assigned scored for each of the promotion windows on the generated list of promotion windows in response to receiving updated promotional attributes.

19. The computer system of claim 15, wherein the set of product data comprises:
   a promotional window start date.

20. The computer system of claim 15, further comprising:
   implementing a highest ranked promotion window of the list of promotion windows based on predetermined business metrics, wherein business metrics include at least one of: a profit margin value, and count of items sold value.

* * * * *